(12) United States Patent
Sugioka et al.

(10) Patent No.: US 9,908,440 B2
(45) Date of Patent: Mar. 6, 2018

(54) SEAT SYSTEM FOR AUTONOMOUS VEHICLES

(71) Applicant: Volvo Car Corporation, Gothenburg (SE)

(72) Inventors: Ichiro Sugioka, Newbury Park, CA (US); Douglas Frasher, Newbury Park, CA (US); Stefan Norberg, Abisko (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/284,939

(22) Filed: Oct. 4, 2016

(65) Prior Publication Data

US 2017/0101032 A1    Apr. 13, 2017

(30) Foreign Application Priority Data

Oct. 7, 2015  (EP) .................................. 15188747

(51) Int. Cl.
| | |
|---|---|
| *B60N 2/22* | (2006.01) |
| *B60N 2/02* | (2006.01) |
| *B60N 2/04* | (2006.01) |
| *G05D 1/02* | (2006.01) |
| *B60H 1/00* | (2006.01) |
| *B60J 3/04* | (2006.01) |
| *B60Q 3/02* | (2006.01) |
| *B60R 16/037* | (2006.01) |

(52) U.S. Cl.
CPC ....... *B60N 2/0244* (2013.01); *B60H 1/00764* (2013.01); *B60H 1/00871* (2013.01); *B60H 1/00878* (2013.01); *B60J 3/04* (2013.01); *B60N 2/045* (2013.01); *B60Q 3/0293* (2013.01); *B60R 16/037* (2013.01); *G05D 1/0238* (2013.01); *B60N 2002/0272* (2013.01)

(58) Field of Classification Search
USPC ................ 701/36, 45, 48, 49; 180/326, 329
See application file for complete search history.

(56) References Cited

U.S. PATENT DOCUMENTS

| | | | | |
|---|---|---|---|---|
| 3,042,449 | A * | 7/1962 | Hutchinson | A47C 1/025 297/366 |
| 5,283,473 | A * | 2/1994 | Furuse | B60N 2/0232 307/10.1 |
| 5,435,625 | A * | 7/1995 | Weber | B60N 2/0232 297/1 |
| 6,053,529 | A * | 4/2000 | Frusti | B60N 2/002 248/429 |
| 2007/0063567 | A1* | 3/2007 | Nakaya | B60N 2/0232 297/362.11 |

(Continued)

FOREIGN PATENT DOCUMENTS

| | | |
|---|---|---|
| DE | 4226747 C1 | 12/1993 |
| DE | 102014002187 A1 | 8/2015 |

*Primary Examiner* — Jonathan M Dager
*Assistant Examiner* — Richard Goldman
(74) *Attorney, Agent, or Firm* — Snyder, Clark, Lesch & Chung, LLP

(57) ABSTRACT

Example embodiments presented herein are directed towards a seat assembly, and corresponding method and computer readable medium, for adjusting a seat in an autonomous vehicle. The adjustment is provided such that a seat occupant may control the adjustment may providing a natural pushing force once the vehicle is in an autonomous driving mode.

21 Claims, 7 Drawing Sheets

(56) References Cited

U.S. PATENT DOCUMENTS

| | | | |
|---|---|---|---|
| 2007/0119647 A1* | 5/2007 | Kusunoki | B60N 2/0252 180/326 |
| 2007/0135982 A1* | 6/2007 | Breed | B60J 10/00 701/36 |
| 2007/0198145 A1* | 8/2007 | Norris | H04L 67/12 701/23 |
| 2009/0020988 A1* | 1/2009 | Sato | B60R 21/207 280/730.2 |
| 2010/0295349 A1* | 11/2010 | Schaal | B60N 2/002 297/216.12 |
| 2012/0053794 A1* | 3/2012 | Alcazar | B60N 2/0244 701/48 |
| 2012/0080920 A1* | 4/2012 | Humer | B60N 2/22 297/354.12 |
| 2013/0002416 A1* | 1/2013 | Gazit | B62D 1/28 340/438 |
| 2013/0166154 A1* | 6/2013 | Kohara | B62D 1/181 701/49 |
| 2015/0012186 A1* | 1/2015 | Horseman | B60W 40/08 701/49 |
| 2015/0094897 A1* | 4/2015 | Cuddihy | B60R 11/0229 701/23 |
| 2015/0142246 A1* | 5/2015 | Cuddihy | B62D 1/183 701/23 |
| 2015/0142247 A1* | 5/2015 | Rao | B60R 21/20 701/23 |
| 2016/0159251 A1* | 6/2016 | Ebina | B60N 2/0244 701/49 |
| 2017/0080825 A1* | 3/2017 | Bonk | B60N 2/0244 |

* cited by examiner

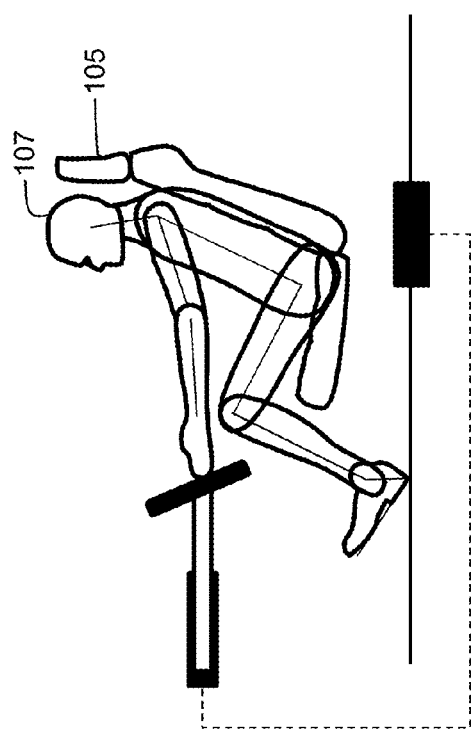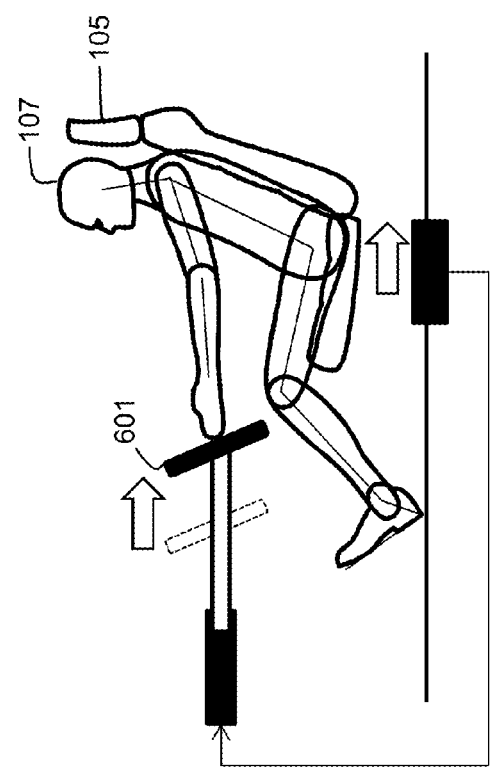

SEAT SYSTEM FOR AUTONOMOUS VEHICLES

RELATED APPLICATION

This application claims priority under 35 U.S.C. § 119 based on European Patent Application No. 15188747.8, filed Oct. 7, 2015, the disclosure of which is hereby incorporated by reference herein.

TECHNICAL FIELD

Example embodiments presented herein are directed towards a seat centered system, and corresponding method and computer readable medium, for adjusting a seat, as well as an ergonomic arrangement according to some of the example embodiments, in an autonomous vehicle. The seat occupant may control the adjustment by providing a natural pushing force on the seat once the vehicle is in an autonomous driving mode.

BACKGROUND

A non-driving period is a period in which a driver does not control the vehicle. An example of such a non-driving period is an autonomous driving mode. An autonomous vehicle is one which is capable of sensing its environment and able to operate the vehicle safely without the need for human input. It is envisioned that such vehicles will be capable of transitioning to and from an autonomous driving mode and a manual driving mode, the latter in which a driver manually operates the vehicle. It is further envisioned that such autonomous driving may only be allowed on preapproved or certified roads or zones.

While in an autonomous driving mode, a driver of a vehicle may engage in activities which may not be possible while the vehicle is in a manual driving mode. Examples of such activities are resting, working or using multimedia applications.

SUMMARY

During an autonomous driving mode, a passenger and driver seat of the vehicle may be adjusted in a manner that is not permitted while the vehicle is in a manual driving mode. For example, the seat may be retracted away from the vehicle controls that are unneeded during autonomous driving.

A need exists to easily allow the seat occupant to easily adjust the seat in an autonomous driving mode. Such an adjustment is not suitable for a manual driving mode.

A further need exists to adjust multiple components simultaneously when the seat is repositioned by distances, for example, exceeding 100 mm in an autonomous driving mode. 100 mm is a seat retraction distance in which a driver will be unable to reach driving control inputs, for example, a steering wheel or foot pedals. Accordingly, the example embodiments presented herein are directed towards providing a means of reclining or translating the vehicle seat, for example, more than 100 mm where such movement is initiated by a natural pushing force provided by the occupant when the vehicle is in an autonomous driving mode. Such a pushing force is a force provided to the seat in which no switches or other mechanical or electrical inputs are provided other than the occupant placing pressure on the seat. Thus, the natural pushing force allows for an easy and efficient means of adjusting the seat, as well as interior vehicle settings, when the vehicle is in an autonomous driving mode.

Accordingly, some of the example embodiments are directed towards a method for adjusting a seat in an autonomous vehicle. The seat comprises a locking mechanism configured to prevent position adjustments of the seat initiated by a pushing force. For example, such prevention is provided while the vehicle is in a manual driving mode. The method further comprises deactivating the locking mechanism on the seat upon a detection of a start of an autonomous driving mode of the vehicle. The method also comprises adjusting the seat according to a pushing force provided by an occupant of the seat.

Such example embodiments provide the example advantage of allowing the occupant to easily adjust the seat position without the need of various switches or other control input means to activate a drive mechanism. Furthermore, the locking mechanism provides the advantage of ensuring that such adjustments, which are allowable during an autonomous driving mode, are not provided in a manual driving mode, thereby ensuring the driver and passenger are in safe positions during the manual driving mode and properly restrained in event of an accident.

According to some of the example embodiments, the method further comprises detecting, with at least one sensor on the seat, the pushing force provided by the occupant of the seat. According to some of the example embodiments, the detection of the pushing force may be used to activate a drive mechanism which may assist in the reclining or translation of the seat.

Such an example embodiment comprises the example advantage of providing an enhancement of the applied pushing force to overcome inherent friction or weight that restricts the precise adjustment of the seat. The measurement of the force is determined via the sensed data.

According to some of the example embodiments, the at least one sensor is a pressure sensor. In such embodiments, the detecting further comprises detecting the pushing force via the occupant pressing down on a floor of the vehicle with his or her feet, leaning back on a back rest of the seat, and/or pushing down on an arm rest of the seat.

An example advantage of such an embodiment is allowing the occupant to simply adjust the seat with his or her body movements.

According to some of the example embodiments, a tension based sensor may be used, for example, a strain gage. The tension based sensor may be incorporated into the drive mechanism or the attachment point of the drive mechanism.

According to some of the example embodiments, the at least one sensor is an optical sensor. In such embodiments, the detecting further comprising detecting a change in translation distance or back inclination angle as result of pushing force via the occupant's feet, hands and/or back on the seat assembly.

An example advantage of such an embodiment is allowing the occupant to adjust the seat based on a detected translation or inclination angle difference of the seat caused by occupant's hands, back and/or feet. Based on the detection, a determination is made that the occupant is attempting to adjust the seat and an estimation may be made as to how much the seat is adjusted. Such an estimation may be used in adjusting other features of the vehicle in accordance with the seat adjust. For example, a control panel may be adjusted so that it is always reachable by the seat occupant. According to some of the example embodiments, the at least one sensor is a magnetic sensor. Such a sensor detects a change in translation distance or back inclination angle as a resulting magnetic field upon an application of the pushing force.

An example advantage of such an embodiment is providing a precise seat adjustment which depends on a sensed measurement of the applied pushing force. It should be appreciated that the example embodiments provided herein may employ any type of sensor mentioned herein singly or in any combination with one another.

According to some of the example embodiments, the adjusting further comprises retracting the seat in a rearward direction to a predetermined distance within the vehicle and/or reclining the seat in a downward position to a predetermined angle if an amount of the detected pushing force is greater than a threshold force.

An example advantage of such an embodiment is providing a binary means of adjusting the seat. Thus, once a detected pushing force surpasses a threshold force, a determination is made that the occupant is attempting to adjust the seat and the seat is adjusted according to a predetermined distance and/or angle. Such a distance and/or angle may be adjustable and preprogrammed according to the occupant's preferences. Thus, according to some of the example embodiments, different user profiles may be created and maintained for different occupants of the vehicle. Thus, the example embodiments allow for flexibility in the occupant providing his or her desired preferences for seat adjustment. According to some of the example embodiments, a history of the occupant's preferences may be maintained. In such instances, a desired seat preference may be predicted and provided without further input from the occupant.

According to some of the example embodiments, the adjusting further comprises retracting the seat in a rearward direction to a retracting distance within the vehicle and/or reclining the seat in a downward position to a reclining angle. According to some of the example embodiments, a greater amount of the pushing force yields a faster change in retracting distance and/or reclining angle.

An example advantage of such embodiments is allowing the occupant more freedom in making various adjustments in real time. Thus, if the occupant wishes to recline or retract the seat further, the occupant merely needs to continue applying pressure to the seat.

According to some of the example embodiments, adjusting at least one environmental condition within the vehicle as the seat is adjusted is provided. The at least one environmental condition comprises a reachability of control input devices, a tinting of vehicle windows, a dimming of internal lights, adjust air vent settings, deploy viewing screens, adjust available content on viewing screens, retraction of driving control inputs, and/or adjust voicemail and/or automatic message settings.

An example advantage of such embodiments is providing a greater amount of comfort in the vehicle. For example, as the seat reclines and/or retracts, an input means may also retract and recline such that the occupant will always be able to reach the device. This prevents the occupant from having to frequently leave the seat in order to change various settings in the vehicle.

According to some of the example embodiments, the method further comprises returning the seat to a manual driving position upon a detection of the upcoming end of the autonomous driving mode.

An example advantage of such an embodiment is the ability of providing a smooth transition of the vehicle between the autonomous and manual driving mode. The transition will include any necessary adjustments to the interior of the vehicle, for example returning the front seat to a manual driving position, with minimal input required from an occupant of the front seat. The locking mechanism is re-activated when the transition is completed.

According to some of the example embodiments, the transition may be halted if the pressure sensors in the seat detect resistance greater than a predetermined threshold, followed by a driver notification, for example, by means of an auditory alarm or visual display. If the resistance is not removed prior to the anticipated end of the autonomous driving mode, the vehicle will take necessary actions to insure safety. Examples of such actions include continued autonomous driving along a safe route, or autonomously stopping in a safety lane.

Some of the example embodiments are directed towards a computer readable medium comprising program instructions for adjusting seat in an autonomous vehicle. The seat comprises a locking mechanism configured to prevent position adjustments of the seat initiated by a pushing force. Execution of the program instructions by one or more processors of a computer system causes the one or more processors to carry out the step of deactivating the locking mechanism on the seat upon a detection of a start of an autonomous driving mode of the vehicle. The step of adjusting the seat according to a pushing force on the seat provided by an occupant of the seat, is also carried out. The steps described above may also be carried out by the one or more processors.

Such example embodiments provide the example advantage of allowing the occupant to easily adjust the seat position without the need of various switches or other control input means. Furthermore, the locking mechanism provides the advantage of ensuring that such adjustments, which are allowable during an autonomous driving mode, are not provided in a manual driving mode, thereby ensuring the driver and passenger are in safe positions during the manual driving mode.

Some of the example embodiments are directed towards a seat assembly for an autonomous vehicle. The seat assembly comprises a seat and a locking mechanism configured to prevent position adjustments of the seat initiated by a pushing force. The seat assembly further comprises a control unit. The control unit is configured to deactivate the locking mechanism once a start of an autonomous driving mode of the vehicle is detected. The control unit is further configured to adjust the seat according to a pushing force on the seat provided by an occupant of the seat.

Such example embodiments provide the example advantage of allowing the occupant to easily adjust the seat position without the need of various switches or other control input means. Furthermore, the locking mechanism provides the advantage of ensuring that such adjustments, which are allowable during an autonomous driving mode, are not provided in a manual driving mode, thereby ensuring the driver and passenger are in safe positions during the manual driving mode.

According to some of the example embodiments, the seat assembly further comprises at least one sensor configured to detect the pushing force provided by an occupant of the seat.

Such an example embodiment has an example advantage of providing an enhancement of the applied pushing force to overcome inherent friction or weight that restricts the precise adjustment of the seat. The measurement of the force is determined via the sensed data.

According to some of the example embodiments, the at least one sensor is a pressure sensor configured to detect the pushing force via the occupant pressing down on a floor of the vehicle with his or her feet, leaning back on a back rest of the seat, and/or pushing down on an arm rest of the seat.

An example advantage of such an embodiment is allowing the occupant to simply adjust the seat with his or her body movements.

Some example embodiments comprise the at least one sensor being an optical sensor configured to detect a change in translation distance or a back inclination angle of the seat caused by occupant's hands, back and/or feet. Based on the detection, a determination is made that the occupant is attempting to adjust the seat and an estimation may be made as to how much the seat is adjusted. Such an estimation may be used in adjusting other features of the vehicle in accordance with the seat adjustment.

Some of the example embodiments comprise the at least one sensor being a magnetic sensor configured to detect a change in a translation distance of back inclination angle as a resulting magnetic field upon an application of the pushing force.

An example advantage of such an embodiment is providing a precise seat position to make adjustments in response to the seat adjustments. It should be appreciated that the example embodiments provided herein may employ any type of sensor mentioned herein singly or in any combination with one another.

According to some of the example embodiments, the control unit is further configured to retract the seat in a rearward direction to a predetermined distance within the vehicle and/or recline the seat in a downward position to a predetermined angle if an amount of the detected pushing force is greater than a threshold force.

An example advantage of such an embodiment is providing a binary means of adjusting the seat. Thus, once a detected pushing force surpasses a threshold force, a determination is made that the occupant is attempting to adjust the seat and the seat is adjusted according to a predetermined distance and/or angle. Such a distance and/or angle may be adjustable and preprogrammed according to the occupant's preferences. Thus, according to some of the example embodiments, different user profiles may be created and maintained for different occupants of the vehicle. Thus, the example embodiments allow for flexibility in the occupant providing his or her desired preferences for seat adjustment. According to some of the example embodiments, a history of the occupant's preferences may be maintained. In such instances, a desired seat preference may be predicted and provided without further input from the occupant.

According to some of the example embodiments, the control unit is further configured to retract the seat in a rearward direction to a retracting distance within the vehicle and/or recline the seat in a downward position to a reclining angle. A greater amount of the pushing force yields a higher rate of change of a retracting distance and/or reclining angle.

An example advantage of such embodiments is allowing the occupant more freedom in making various adjustments in real time. Thus, if the occupant wishes to recline or retract the seat further, the occupant merely needs to add a greater amount of pressure on to the seat.

According to some of the example embodiments, the control unit is further configured adjust at least one environmental condition within the vehicle as the seat is adjusted. The at least one environmental condition comprises a reachability of control input devices, a tinting of vehicle windows, a dimming of internal lights, adjust air vent settings, deploy viewing screens, adjust available content on viewing screens, retracting driving control inputs, and/or adjust voicemail and/or automatic message settings.

An example advantage of such embodiments is providing a greater amount of comfort in the vehicle. For example, as the seat reclines and/or retracts, an input means may also retract and recline such that the occupant will always be able to reach the device. This prevents the occupant from having to frequently leave the seat in order to change various settings in the vehicle.

According to some of the example embodiments, the control unit is further configured to return the seat of a manual driving position upon detection of an end of an autonomous driving mode.

An example advantage of such an embodiment is the ability of providing a smooth transition of the vehicle between the autonomous and manual driving mode. The transitional will include any necessary adjustments to the interior of the vehicle, for example returning the front seat to a manual driving position, with minimal input required from an occupant of the front seat.

Some of the example embodiments are directed towards a vehicle comprising the seat assembly described above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 5A-5B and 6A-6B are illustrative examples of a vehicle environmental change provided as a result of an adjusted seat position, according to some of the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

The terminology used herein is for the purpose of describing the example embodiments and is not intended to limit the embodiments presented herein. It should be appreciated that the example embodiments discussed herein are in relation to a vehicle. The figures provided feature the vehicle in the form of a car. However, it should be appreciated that a vehicle shall be interpreted to include cars, trucks, busses and construction equipment, as well as airplanes, boats, ships, spacecraft and any other means of transportation.

During an autonomous driving mode, a passenger and driver seat of the vehicle may be adjusted in a manner that is not permitted while the vehicle is in a manual driving mode. For example, the seat may be retracted away from the vehicle controls that are unneeded during autonomous driving.

A need exists to easily allow the seat occupant to easily adjust the seat in an autonomous driving mode. Such an adjustment is not suitable for a manual driving mode. A further need exists to adjust multiple components simultaneously when the seat is repositioned by distances, for example, exceeding 100 mm in an autonomous driving mode. 100 mm is a seat retraction distance in which a driver will be unable to reach driving control inputs, for example, a steering wheel or foot pedals.

Accordingly, the example embodiments presented herein are directed towards providing a means of reclining or translating the vehicle seat more than 100 mm based only on a natural pushing force provided by the occupant when the vehicle is in an autonomous driving mode. Such a pushing force is a force provided to the seat in which no switches or other mechanical or electrical inputs are provided other than the occupant placing pressure on the seat. Thus, the natural pushing force allows for an easy and efficient means of adjusting the seat, as well as interior vehicle settings, when the vehicle is in an autonomous driving mode. It should be appreciated that the example embodiments may be applied to either or both of a passenger or driver seat of a vehicle. It should further be appreciated that the terms natural pushing force and pushing force may be used interchangeably herein.

Figure 1:
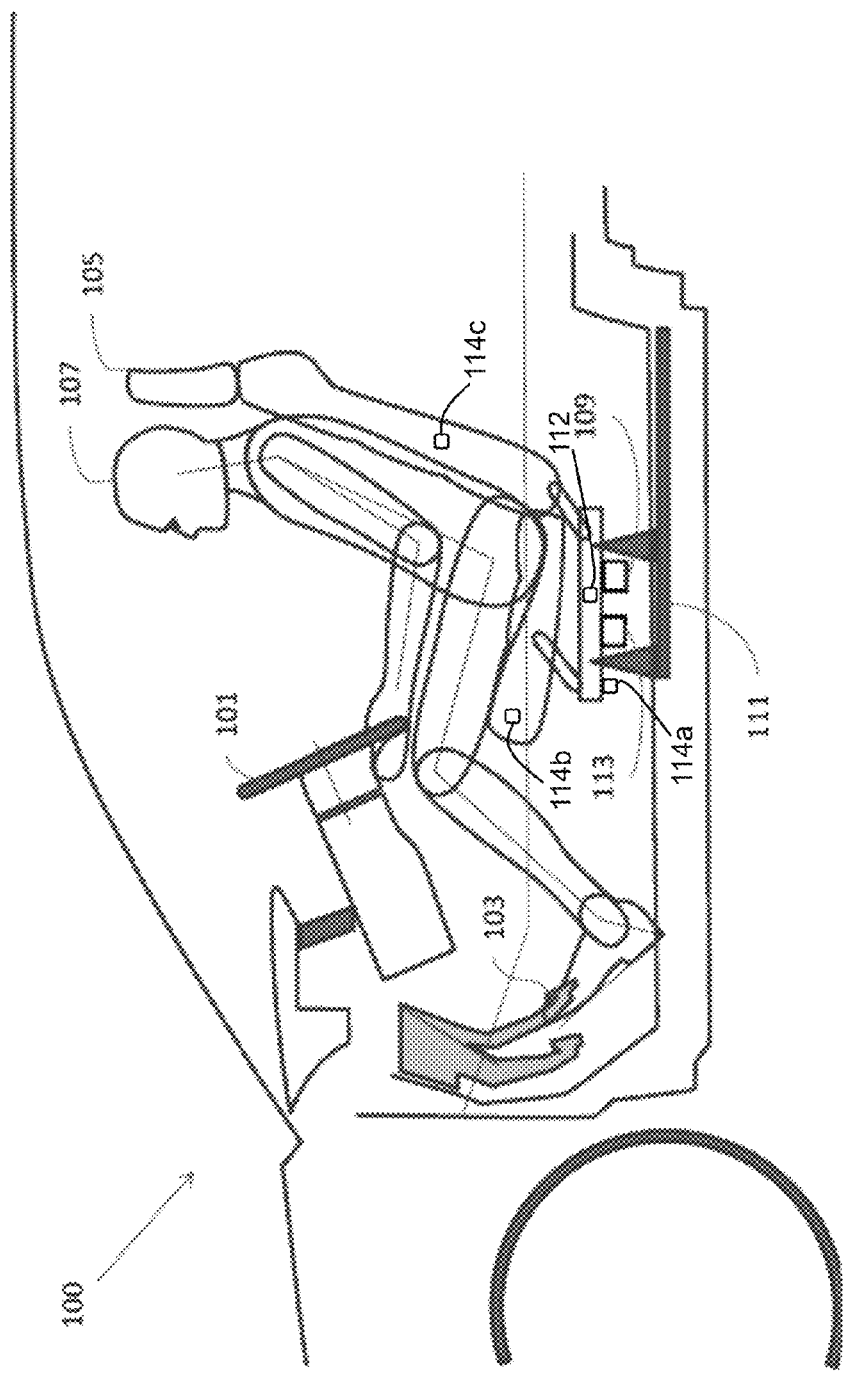
FIG. 1 is an illustrative example of an adjustable seat assembly, according to some of the example embodiments.

FIG. 1 illustrates a cross-sectional view of a vehicle 100 according to some of the example embodiments. The vehicle 100 comprises a number of driving control input devices, such as a steering wheel 101, foot pedals 103 and a gear shift (not illustrated). In a manual driving mode, a front seat 105 is situated such that an occupant 107 is in reach of the driving input devices, for example, the steering wheel 101 and the foot pedals 103, as illustrated in FIG. 1, or the gear shift. In FIG. 1, the front seat is in what will be referred to herein as a manual driving position. Specifically, the front seat is in a position in which a driver may manually operate the vehicle.

The front seat 105 comprises a locking mechanism 112 which prevents seat adjustments provided by a natural pushing force provided by the occupant 107 while the vehicle is in a manual driving mode, which is a driving mode where the driver is in operation of the vehicle. While in a manual driving mode, the front seat 107 may be adjusted according to any manner known in the art.

During operation, the vehicle may at some point transition into an autonomous driving mode. During such a transition, a front seat occupant 107 is provided with an option of adjusting the front seat 105 in a manner which would not otherwise be allowed in a manual driving mode. For example, the front seat 105 may be retracted towards the rear of the vehicle by a distance greater than 100 mm, such that the occupant 107 is no longer within reach of any of the control inputs 101 or 103. Furthermore, the front seat 105 may be reclined in a manner such that the occupant 107 may be in a horizontal position suitable for sleep. According to the example embodiments, once a control unit 109 detects a start of an autonomous driving mode, the control unit 109 may deactivate the locking mechanism 112. It should be appreciated that the control unit 109 may be any suitable type of computation unit, for example, a microprocessor, digital signal processor (DSP), field programmable gate array (FPGA), or application specific integrated circuit (ASIC), or any other form of circuitry or module. The control unit may comprise a memory unit or circuitry, which may be any suitable type of computer readable memory and may be of volatile and/or non-volatile type. The memory may be configured to store received parameters, settings, instructions, traffic or route, executable program instructions, etc.

Typically, a vehicle front seat comprises a short pitched lead screw which is a rotational gear element used in translating the front seat rearward. The short pitch of the lead screw being employed naturally locks the seat in position when the screw stops rotating. According to the example embodiments presented herein, the short pitched lead screw is replaced with a long pitch screw. A short pitch lead screw will lock the seat in place when the drive motor is powered. A long pitch lead screw allows the drive motor to freewheel, thus not locking the seat in place. Therefore, such a replacement eliminates the inherent locking function of the short-pitch lead screw. Thus, a separate lock, the locking mechanism 112 is employed to ensure the seat may not be adjusted via a natural pushing force when the vehicle is in a manual driving mode.

The locking mechanism 112 may be in the form of an electrically releasable ratchet-type pawl lock or an electrically releasable clamp. According to such an example embodiment, an electrical solenoid may be utilized to release the pawl to enable the natural transition of the seat by the occupant. According to some of the example embodiments, an electrically released pawl may be used on a toothed wheel to lock a rotational position of the seat back.

According to some of the example embodiments, the locking mechanism 112 may be in the form of a rotational brake which may be used to lock a rotational motor in any number of predetermined positions. According to some of the example embodiments the locking mechanism may allow for free rotation without engaging a geared electrical or rotational motor.

It should be appreciated that separate locking mechanisms for translation and reclining may be employed or a single locking mechanism may be used. In the case that multiple locking mechanisms are employed, it should be appreciated that such locking mechanisms may be configured to operation jointly or independently.

Once the locking mechanism 112 has been deactivated, the front seat 105 may be adjustable as a result of a natural pushing force provided by the occupant. It should be appreciated that the term natural pushing force or pushing force used herein shall be interpreted as a user input provided from the occupant in which no mechanical or electrical switches are employed. The user provided input is solely provided as a result of the occupant extorting a force on to the seat 105.

The pushing force provided by the occupant 107 may be detected by any number of sensors. As illustrated in FIG. 1, such a sensor may be placed within a seat chassis, as is illustrated by sensor 114*a*. Other example placements for such sensors may be on the seat itself. For example, the sensor may be placed on the seat bottom or a seat back, as is illustrated via sensors 114*b* and 114*c*, respectively.

It should be appreciated that the sensors may be placed in any location within the vehicle or seat in which the sensor may detect the pushing force the any manner described herein. For example, any number of sensors may be placed on a rail structure 111 in which the seat may be retracted along. It should be appreciated that any number of sensors may be employed for detecting the pushing force.

According to some of the example embodiments, at least one sensor may be a weight and/or pressure sensor. According to such embodiments, the detecting of the pushing force is provided by the occupant, for example, pressing down on a floor of the vehicle with his or her feet, pushing down on an arm rest of the seat and/or applying pressure on the seat back.

According to some of the example embodiments, the at least one sensor may be a tension based sensor, for example a strain gauge. Such a sensor may be incorporated into the drive mechanism or the attachment point of the drive mechanism. The drive mechanism may be incorporated with the control unit 109. The drive mechanism may be used to assist in the translation or reclining of the front seat once a natural pushing force has been detected.

According to some of the example embodiments, at least one sensor may be an optical sensor. In such embodiments, the sensor is configured to detect a change in translation distance or in a back inclination angle as a result of the pushing force via the occupant's feet, hand and/or back on the seat assembly. Thus, the seat occupant is able to adjust the seat based on the detected translation or inclination difference. Based on the detection, a determination may be made that the occupant is attempting to adjust the seat. Thereafter, the control unit may provide an estimation as to how much the seat is adjusted based on an estimated amount of pushing force or a pre-setting.

According to some of the example embodiments, at least one sensor may be a magnetic sensor. Such a sensor detects a change in a translation distance or back inclination angle as a resulting magnetic field upon an application of the pushing force. For example, the seat may comprise any number of magnetic elements. A fixed position relative to the seat, for example on the floor of the vehicle, may also comprise a number of magnetic elements. As the translation distance and back inclination angle of the seat changes, a resulting magnetic force between the magnetic elements on the seat and the magnetic elements on the fixed surface will change. Based on this detected change of the magnetic field, an estimation may be made with respect to the amount of pushing force being applied to the seat.

According to some of the example embodiments, a reclining angle of the seat may be detected using, for example, an electronic inclinometer.

Figure 2:
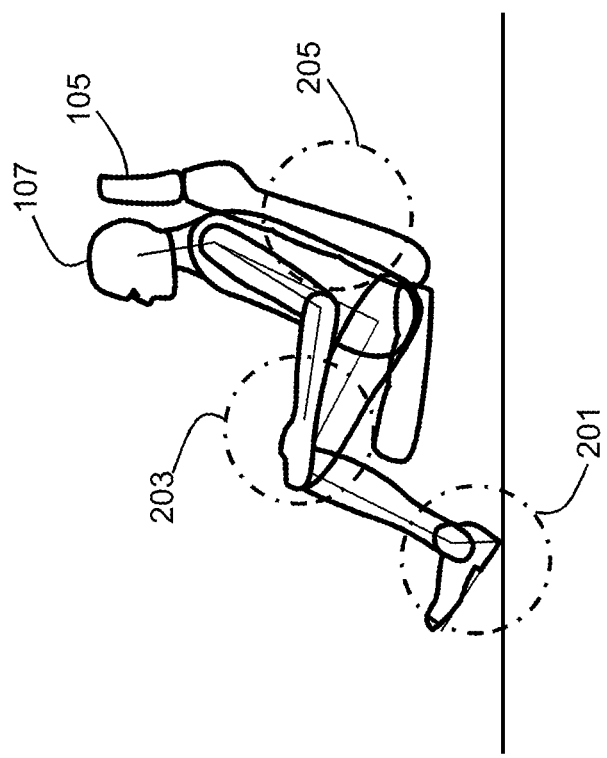
FIG. 2 is an illustrative examples of the form of pushing force provided by the seat occupant, according to some of the example embodiments.

FIG. 2 illustrates examples of various surfaces which may be used by the seat occupant in applying the pushing force for seat adjustment. The pushing force may be applied on an area of the floor 201 the vehicle immediately in front of the seat. The occupant may push down on area 201 with his or her feet causing a weight and/or pressure shift on the seat 105. Additionally, the occupant 107 may also apply pressure on at least one arm rest area 203. A further example may be an application of pressure on a seat back area 205. The seat assembly may be configured to sense a change in weight or pressure on the seat as a result of the pushing force applied to areas 201, 203 or 205. Additionally, optical sensors may be used to detect an interaction of the occupant with areas 201, 203 and 205. Such an interaction may be interpreted as an application of the pushing force for seat adjustment. It should be appreciated that areas 201, 203 and 205 are shown as examples and other areas of the seat or surrounding vehicle surfaces may also be identified as pushing surfaces for providing the natural pushing force.

According to some of the example embodiments, the seat 105 may be load balanced in order to effectively detect the natural pushing force provided by the seat occupant 107. This type of seat reclines on a pivot point that remains close to the combined center of gravity of the seat and the occupant throughout the reclining motion. In some embodiments, weights or springs may be used to adjust the effective center of gravity location.

Figure 3:
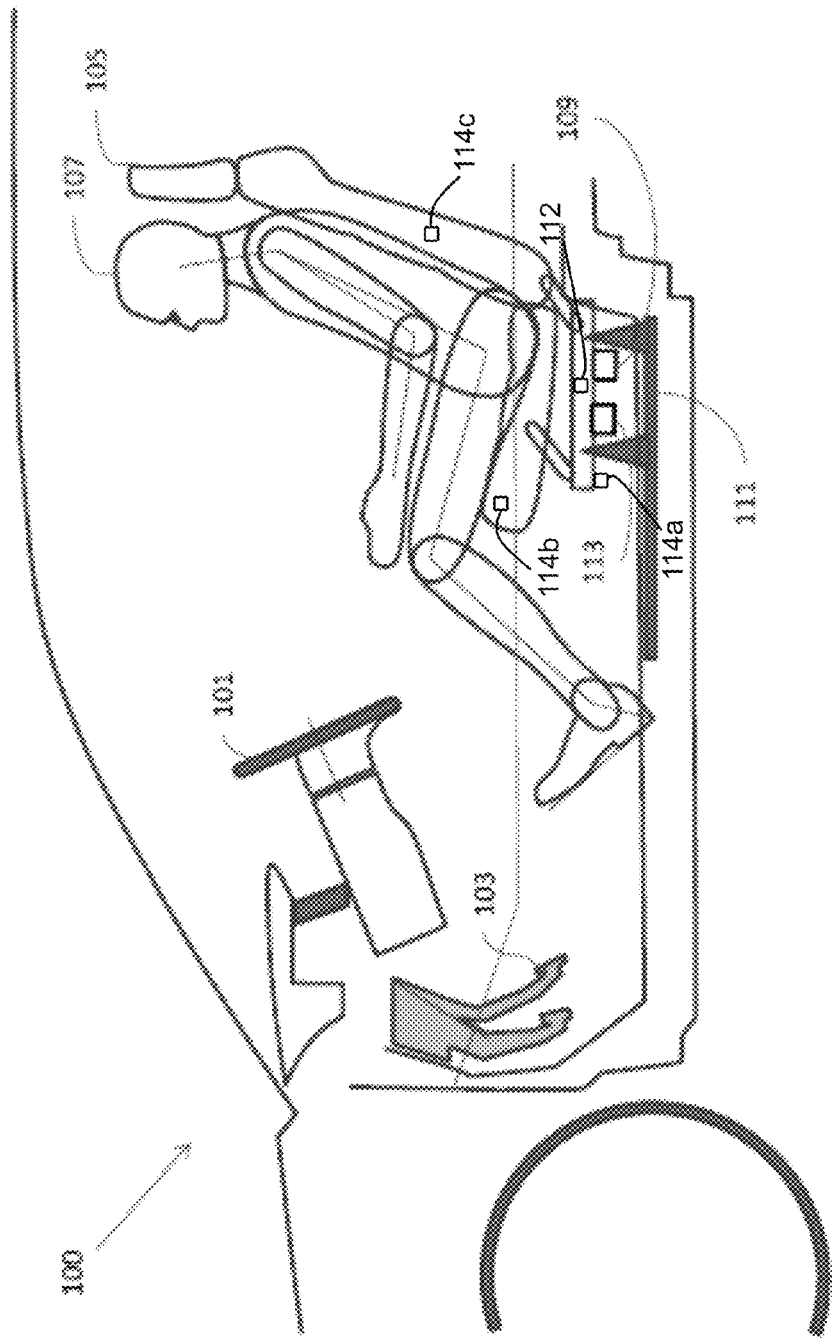
FIG. 3 is an illustrative example of the seat assembly of FIG. 1 in a retracted position, according to some of the example embodiments.

Upon detection of the application of the pushing force provided by the seat occupant 107, a control unit 109 may be configured to adjust the seat. Such an adjustment may comprise a retraction or translation of the seat towards a rearward direction in the vehicle. FIG. 3 illustrates the seat in a retracted position. As compared to the manual driving position, in the retracted position the front seat has translated or retracted in a direction towards the backend of the vehicle. According to some of the example embodiments, such retraction may be any distance greater than 100 mm. It should be appreciated that the control unit 109 in FIGS. 1 and 3 is situated beneath the front seat 105, however this is merely as an example. The control unit 109 may be situated on any location of the seat, the floor of the vehicle, the instrument panel, or any other location within the vehicle.

During the retraction, the front seat 105 is configured to move or slide along any number of rails 111 that are located on the floor of the vehicle 100. According to some of the example embodiments, the control unit 109 may comprise a drive mechanism or actuator 113, or the control unit 109 may be in communication with the drive mechanism or actuator 113. The drive mechanism or actuator 113 is configured to control a speed of retraction. For example, the drive mechanism or actuator may provide a retraction speed that varies during retraction such that the occupant 107 will experience a smooth movement backward rather than jerking motion. According to some of the example embodiments, the drive mechanism or actuator 113 may employ an energy absorption function in providing the accelerated retraction.

According to some of the example embodiments, the control unit 109 is configured to retract the front seat 105 in a binary mode of operation. Specifically, the control unit 109 is configured to retract the front seat a distance, which may be determined based on a user profile or preference. For example, if the amount of the applied pushing force on the seat surpasses a predetermined pressure threshold, the control unit may be configured to adjust the seat according to the occupant's pre-specified preferences.

According to some of the example embodiments, the retraction distance may also be determined based on the occupant's height, which may be determined via sensor data or via user input.

According to some of the example embodiments, the control unit 109 may be configured to retract the front seat 105 in a linear mode of operation. Specifically, the control unit may be configured to retract the front seat as a function of the applied pushing force. For example, the greater the amount of force applied by the occupant to the seat, the further the retraction distance and/or the reclining angle which will be applied during the seat adjustment. In such an example embodiment, the movement of the seat may be determined once the pushing force provide by the occupant has been released. According to some of the example embodiments, a greater amount of the pushing force may also result in a higher rate of change in the retraction of the seat.

Figure 4:
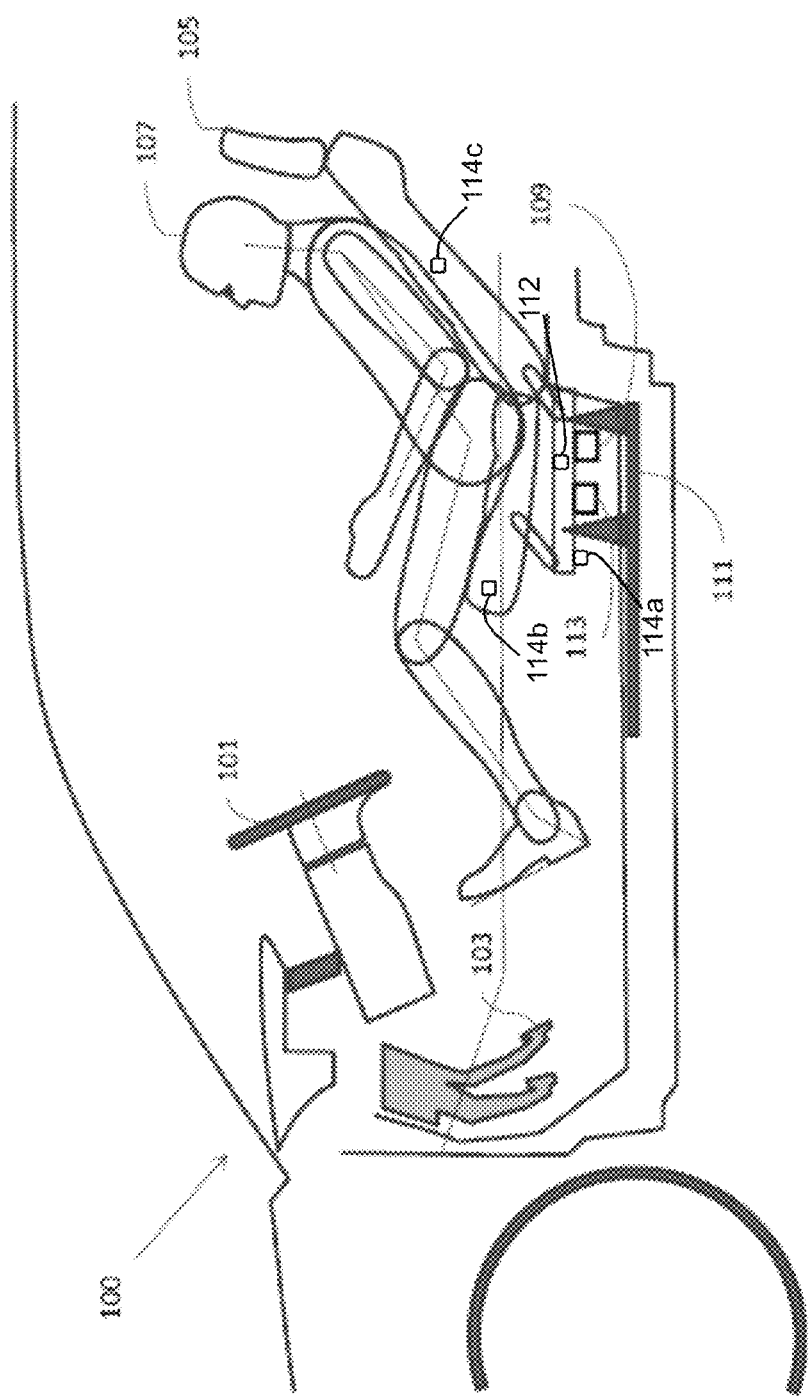
FIG. 4 is an illustrative example of the seat assembly of FIG. 1 in both a retracted and reclined position, according to some of the example embodiments.

According to some of the example embodiments, in addition to the front seat 105 being retracted, the front seat may also be reclined, as illustrated in FIG. 4. A reclined position may be provided when the a back rest of the front seat is situated at any angle greater than 90 degrees as compared to a seat pan of the front seat. Similarly to the retraction of the front seat, the reclining may be provided based on a sensed measurement of the pushing force, for example, using any of sensors 114a-114c, or via the natural pushing force alone. The reclining may be provided in a binary and/or linear mode of operation as described in conjunction with the retracting or translation adjustment. Furthermore, a greater amount of the pushing force may result in a higher rate of change of the reclining angle of the seat.

According to some of the example embodiments, the retraction/translation and/or reclining of the seat may prompt a change of at least one environmental condition within the vehicle. An example of such an environmental condition may be a reachability of control input devices. An example of such a control input device may be a touch screen, a control panel, or any form of switch or button used to control features or settings within the vehicle.

FIGS. 5A and 5B illustrate an environmental change in which a reachability of a control input device is adjusted as a result of the seat adjustment. In FIG. 5A, the front seat is in a manual driving position. In the manual driving position, the occupant may be in contact with a control input device, for example, a touch screen 601. In FIG. 5B, the front seat is in a retracted position. As a result of the seat retraction, the touch screen 601 may also be retracted such that the occupant may be in reaching distance of the touch screen even as the seat position has changed.

A further example of an environmental condition may be a tinting of the vehicle windows and/or dimming of interior lights. For example, if the seat is reclined an amount above a threshold, the control unit may interpret such a seat adjustment as the occupant attempting to sleep and thereby provide the occupant with privacy and a suitable environment for sleeping.

Figure 6A:
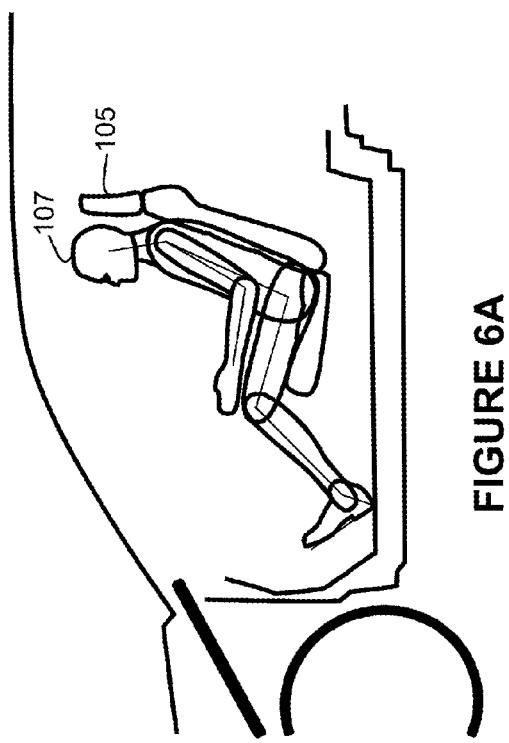
Figure 6B:
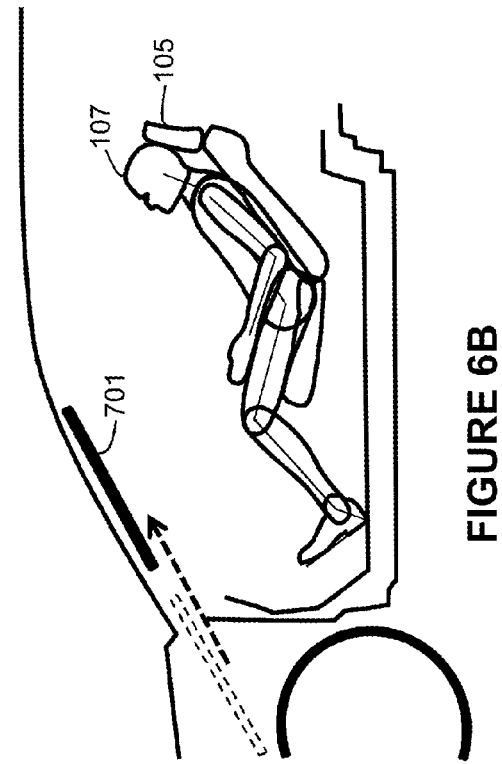

FIGS. 6A and 6B illustrate a further example of an environmental change according to an adjusted seat position. In FIG. 6A, the seat is in a manual driving position. In FIG. 6B, the seat is in a retracted and reclined position. According to some of the example embodiments, once the seat is detected as being in a retracted and/or reclined position, for example past a predetermined retraction and/or reclining threshold, a screen 701 is position as to provide the occupant privacy. Such a screen would not be deployable in a manual driving mode as it would prevent the driver from viewing the road.

Another example of an environmental condition is an adjusting of the vehicle air vents. Thus, an amount of seat retraction and/or recline may be measured and the air vents adjusted accordingly so that the vents are directed in the same position relative to the seat occupant.

A further example of an environmental condition that may be adjusted is a deploying of a viewing screen. Larger viewing screens, for example, a screen comprising a length of 600-700 mm or greater in a horizontal direction, may be used in autonomous vehicles. Such large viewing screens may not be optimal when the front seat is in the manual driving position. In larger viewing screens, the optimal viewing distance may require a retraction of the front seat. Thus, according to some of the example embodiments, upon the detection that the front seat has or is about to be retracted, for example, according to the example embodiments described herein, the viewing screen may be deployed.

According to some of the example embodiments, the content on such a screen may also be adjusted based on the position of the front seat. For example, if it is detected that the front seat is in a reclined position, for example, suitable for sleep, the menu may appear on the viewing screen providing various setting options for the vehicle which are optimal for an occupant wanting to rest. According to some of the example embodiments, once the front seat is detected as being in a position suitable for sleep, the viewing screen may adapt a dimmed setting so as to not disturb the seat occupant.

Yet a further example of an environmental change is an adjustment of voicemail and/or automatic message settings. For example, if the seat is retracted or in a fully reclined position, the control unit may interpret such a position as the occupant attempting to rest or watching media on the viewing screen and may direct all incoming calls to voicemail as to not disturb the occupant.

It should be appreciated that any of the environmental adjustments described above may be user programmable. It should further be appreciated that any adjustment preferences may be provided via a user profile in which a user may select his or her desired environmental adjustments.

The control unit 109 may be configured to return the front seat 105 to the initial position or a manual driving position. The returning of the front seat may be prompted by a user initiated command or due to an expected end to the autonomous driving mode. An expected end may be the result of leaving a certificated road or zone for autonomous driving. An expected end to the autonomous driving mode may also comprise the detection of an imminent crash or any other event in which a driver would be required to take control of the vehicle and thus enter a manual driving mode.

It should be appreciated that the use of sensors on the seat assembly are optional. According to some of the example embodiments, the front seat may be configured for adjustment solely based on the pushing force provided by the occupant without the need of measuring such force.

Figure 7:
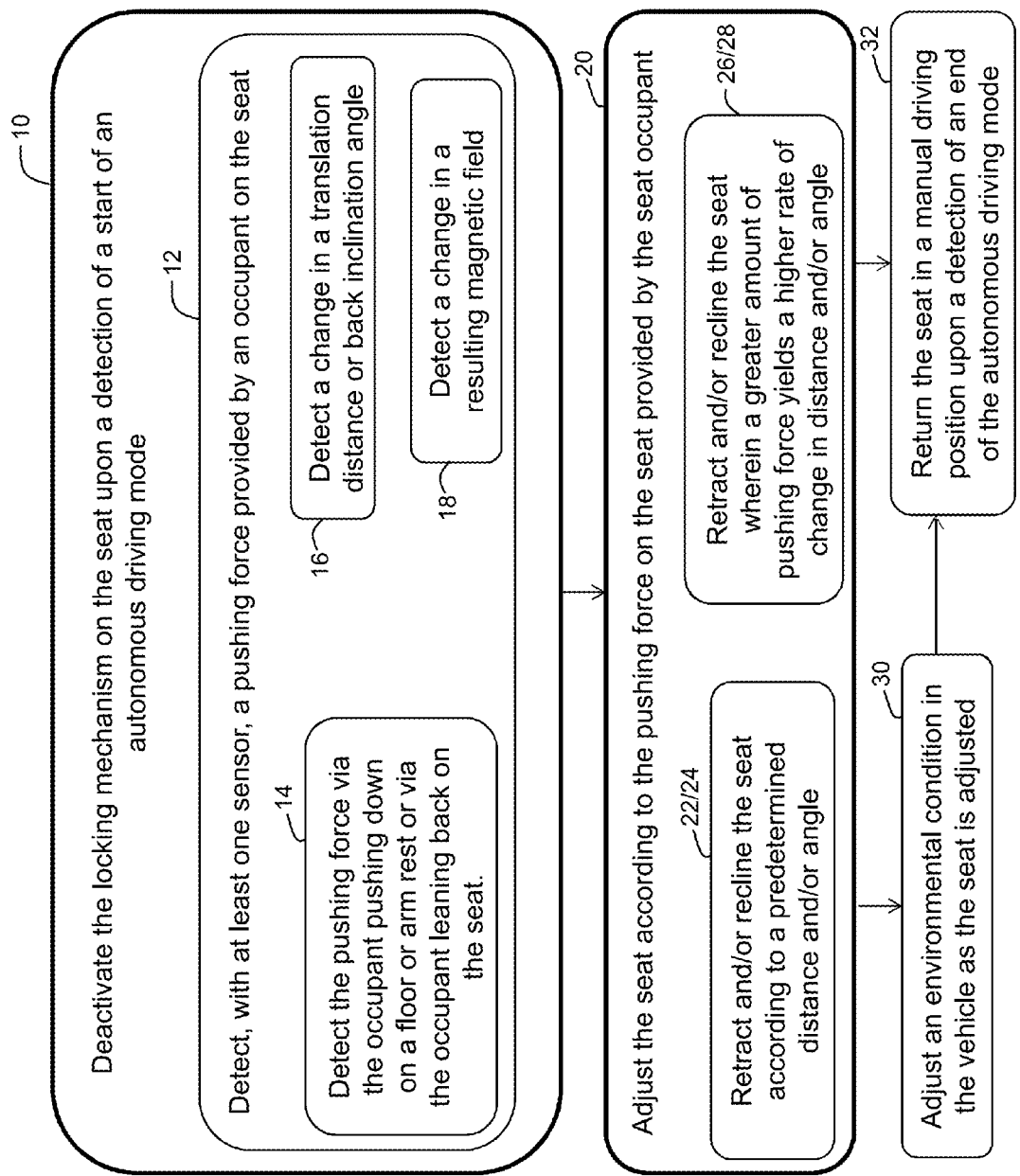
FIG. 7 is a flow diagram depicting example operations which may be taken by the seat assembly, according to some of the example embodiments.

FIG. 7 is a flow diagram depicting example operations which may be taken by the seat assembly according to some of the example embodiments. First, the locking mechanism on the seat may be deactivated upon a detection of a start of an autonomous driving mode of the vehicle (10). The locking mechanism is configured to prevent position adjustments of the seat initiated by the pushing force while the seat is in a manual driving mode. When the seat is adjusted due to the natural pushing force, the seat may be positioned to retract or translate in a rearward direction and/or recline in a downward direction. Such adjustments are not possible in a manual driving mode as they may interfere with the driver's ability to control the car.

According to some of the example embodiments, the seat assembly is further configured to detect, with at least one sensor, a pushing force provided by the occupant of the seat (12). Examples of such a sensor are provided in at least FIG. 1, sensors 114a-114c.

According to some of the example embodiments, the sensor is a pressure or weight sensor. In such an embodiment, the detecting is performed via the occupant pressing down on a floor of the vehicle with his or her feet, leaning back on a back rest of the seat, and/or pushing down on an arm rest of the seat (14).

According to some of the example embodiments, the sensor is an optical sensor. In such an embodiment, the sensor is configured to detect a change in translation distance and/or a back inclination angle as a result of the pushing force (16). For example, there may be some form of a fixed visual indicator and a visual indicator which is on a movable portion of the seat assembly. The optical sensor may be configured to detect a change in the translation distance or back inclination angle between the two indicators.

According to some of the example embodiments, the sensor is a magnetic sensor. In such embodiments, the sensor may be configured to detect a change in a resulting magnetic field caused by a translation or back inclination change of the seat assembly (18). For example, there may be some form of a fixed magnetic element and a magnetic element which is on a movable portion of the seat assembly. A magnetic field will be present between the two magnetic elements. As the seat changes position due to translation or back inclination angle changes, the resulting magnetic field will also change. Thus, the detection may comprise detecting a change in a resulting magnetic field.

The seat assembly is further configured to adjust the seat according to the pushing force on the seat provided by the occupant of the seat (20). According to some of the example embodiments, the adjusting comprises retracting the seat in a rearward direction to a predetermined distance within the vehicle (22). The adjusting may also comprise reclining the seat in a downward position to a predetermined angle (24).

According to some of the example embodiments, such retracting and reclining may be provided if an amount of the detected pushing force is greater than a threshold force. Thus, such retraction and reclining may be performed in a binary manner where upon detection of a force beyond the threshold, the seat is adjusted according to the predetermined distance or angle. It should be appreciated that the threshold force and the predetermined distance or angle may be user programmable or adjustable.

According to some of the example embodiments, the adjust comprises retracting the seat in a reward direction (26) and/or reclining the seat in a downward position (28), where a greater amount of the pushing force yields a higher rate of change in retracting distance and/or the reclining angle. Thus, such retraction and reclining may be performed in a binary fashion where the greater the force applied the faster, and/or the greater the distance, of the retraction or reclining.

According to some of the example embodiments, the seat assembly is further configured to adjust at least one environmental condition within the vehicle as the seat is adjusted (30). Such an example embodiment is described in relation to at least FIGS. 5A-6B. An example of an environmental condition within the vehicle is a reachability of control input devices, as described in FIGS. 5A and 5B. A further example is the tinting of vehicle windows or applying a privacy shield in the vehicle, as described in relation to FIGS. 6A and 6B.

A further example of an environmental condition is the dimming of internal lights within the vehicle. For example, if the seat is reclined past a certain back inclination angle, the control unit may be configured to dim the lights. Such an embodiment may be useful if the occupant wishes to sleep. Yet a further example of an environmental condition is adjusting air vent settings such that the flow of air will always be directed on the seat occupant during and/or after any applied seat adjustments.

Another example is deploying viewing screens. For example, such viewing screens may be large and therefore comprise an optimal viewing distance in which the seat is retracted beyond a distance which is suitable for a manual driving mode. Another example is adjusting available content on viewing screens. For example, if the occupant is in position to be asleep, the viewing screen may be adjusted to be dimmed and/or play soothing music.

Further examples of an environmental condition are, retraction of driving control inputs (e.g., a steering wheel or foot pedals), and/or adjusting voicemail and/or automatic message settings. It should be appreciated that all environmental conditions may be user programmable and different adjustments may be applied according to different occupant user profiles.

According to some of the example embodiments, the seat may be returned to a manual driving position upon a detection of an end of the autonomous driving mode (32).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for adjusting a seat in an autonomous vehicle, the seat comprising a locking mechanism configured to prevent position adjustments of the seat initiated by a pushing force, the method comprising:
   detecting, by a control a start of an autonomous driving mode of the vehicle;
   deactivating, by the control unit the locking mechanism in response to detecting the start of the autonomous driving mode of the vehicle; and
   adjusting, by the control unit the seat, after deactivating the locking mechanism, according to a pushing force on the seat provided by an occupant of the seat.

2. The method of claim 1, further comprising detecting, with at least one sensor, the pushing force provided by the occupant of the seat.

3. The method of claim 2, wherein the at least one sensor is a pressure sensor and the detecting the pushing force further comprises at least one of:
   detecting the pushing force via the occupant pressing down on a floor of the vehicle with the occupant's feet,
   leaning back on a back rest of the seat, or
   pushing down on an arm rest of the seat.

4. The method of claim 2, wherein the at least one sensor is an optical sensor and the detecting the pushing force further comprises detecting a change in translation distance or back inclination angle as result of the pushing force.

5. The method of claim 2, wherein the at least one sensor is a magnetic sensor and the detecting the pushing force further comprises detecting a change in translation distance or back inclination angle due to a resulting magnetic field upon an application of the pushing force.

6. The method of claim 1, wherein when an amount of the detected pushing force is greater than a threshold force, the adjusting further comprises at least one of:
   retracting the seat in a rearward direction to a predetermined distance within the vehicle, or
   reclining the seat in a downward position to a predetermined angle.

7. The method of claim 1, wherein the adjusting further comprises at least one of:
   retracting the seat in a rearward direction to a retracting distance within the vehicle, wherein a greater amount of the pushing force yields a higher rate of change in the retracting distance, or
   reclining the seat in a downward position to a reclining angle, wherein a greater amount of the pushing force yields a higher rate of change in the reclining angle.

8. The method of claim 1, further comprising adjusting at least one environmental condition within the vehicle as the seat is adjusted, wherein the at least one environmental condition comprises:
   a reachability of control input devices,
   a tinting of vehicle windows,
   a dimming of internal lights,
   air vent settings,
   a deployment of viewing screens,
   available content on viewing screens,
   a retraction of driving control inputs,
   voicemail settings, or
   automatic message settings.

9. The method of claim 1, further comprising:
   detecting an end of the autonomous driving mode; and
   returning the seat to a manual driving position in response to detecting the end of the autonomous driving mode.

10. A non-transitory computer readable medium comprising program instructions for adjusting seat in an autonomous vehicle, the seat comprising a locking mechanism configured to prevent position adjustments of the seat initiated by a pushing force, wherein execution of the program instructions by one or more processors of a computer system causes the one or more processors to:
    detect a start of an autonomous driving mode of the vehicle;
    deactivate the locking mechanism in response to detecting the start of the autonomous driving mode of the vehicle; and
    adjust, after deactivating the locking mechanism, the seat according to a pushing force on the seat provided by an occupant of the seat.

11. The non-transitory computer readable medium of claim 10, wherein the program instructions further cause the one or more processors to:
    detect, with at least one sensor, the pushing force provided by the occupant of the seat.

12. A seat assembly for an autonomous vehicle, the seat assembly comprising:
    a seat;
    a locking mechanism configured to prevent position adjustments of the seat initiated by a pushing force; and
    a control unit;
    wherein the control unit is configured to:
      detect a start of an autonomous driving mode of the vehicle;
      deactivate the locking mechanism once a in response to detecting the start of the autonomous driving mode of the vehicle; and
      adjust the seat according to a pushing force provided on the seat by an occupant of the seat.

13. The seat assembly of claim 12, further comprising at least one sensor configured to detect the pushing force provided by the occupant of the seat.

14. The seat assembly of claim 13, wherein the at least one sensor is a pressure sensor configured to detect the pushing force via at least one of:
    the occupant pressing down on a floor of the vehicle with the occupant's feet,
    leaning back on a back rest of the seat, or
    pushing down on an arm rest of the seat.

15. The seat assembly of claim 13, wherein the at least one sensor is an optical sensor configured to detect a change in translation distance or a back inclination angle as a result of the pushing force.

16. The seat assembly of claim 13, wherein the at least one sensor is a magnetic sensor configured to detect a change in translation distance or a back angle inclination angle due to a resulting magnetic field upon an application of the pushing force.

17. The seat assembly of claim 13, wherein when an amount of the detected pushing force is greater than a threshold force, the control unit is further configured to at least one of:
    retract the seat in a rearward direction to a predetermined distance within the vehicle, or
    recline the seat in a downward position to a predetermined angle.

18. The seat assembly of claim 12, wherein the control unit is further configured to at least one of:
    retract the seat in a rearward direction to a retracting distance within the vehicle, or
    recline the seat in a downward position to a reclining angle, wherein a greater amount of the pushing force yields a higher rate of change in the retracting distance or the reclining angle.

19. The seat assembly of claim 12, wherein the control unit is further configured to:
    adjust at least one environmental condition within the vehicle as the seat is adjusted, wherein the at least one environmental condition comprises:
    a reachability of control input devices,
    a tinting of vehicle windows,
    a dimming of internal lights,
    air vent settings,
    a deployment of viewing screens,
    available content on viewing screens,
    a retraction of driving control inputs,
    voicemail settings, or
    automatic message settings.

20. The seat assembly of claim 12, wherein the control unit is further configured to:
    detect an end of the autonomous driving mode, and
    return the seat to a manual driving position in response to detecting the end of the autonomous driving mode.

21. A vehicle comprising the seat assembly of claim 12.

* * * * *

UNITED STATES PATENT AND TRADEMARK OFFICE
CERTIFICATE OF CORRECTION

PATENT NO. : 9,908,440 B2
APPLICATION NO. : 15/284939
DATED : March 6, 2018
INVENTOR(S) : Ichiro Sugioka et al.

It is certified that error appears in the above-identified patent and that said Letters Patent is hereby corrected as shown below:

In the Claims

In Claim 1, Line 5 (Column 15, Line 6), insert the word --unit-- after the word "control".

In Claim 12, Line 10 (Column 16, Line 29), delete the phrase "once a" after the word "mechanism".

Signed and Sealed this
Fifth Day of June, 2018

Andrei Iancu
*Director of the United States Patent and Trademark Office*